(12) United States Patent
Kim

(10) Patent No.: US 12,319,278 B2
(45) Date of Patent: Jun. 3, 2025

(54) DRIVER ASSISTANCE SYSTEM AND DRIVER ASSISTANCE METHOD

(71) Applicant: HL KLEMOVE CORP., Incheon (KR)

(72) Inventor: Jaekyeong Kim, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 193 days.

(21) Appl. No.: 18/099,858

(22) Filed: Jan. 20, 2023

(65) Prior Publication Data
US 2023/0234569 A1    Jul. 27, 2023

(30) Foreign Application Priority Data
Jan. 21, 2022    (KR) .................. 10-2022-0009189

(51) Int. Cl.
*B60W 30/09* (2012.01)
*B60W 10/20* (2006.01)

(52) U.S. Cl.
CPC ............ *B60W 30/09* (2013.01); *B60W 10/20* (2013.01); *B60W 2420/403* (2013.01); *B60W 2554/80* (2020.02)

(58) Field of Classification Search
CPC ................. B60W 30/09; B60W 10/20; B60W 2420/403; B60W 2554/80; B60W 2554/4026; B60W 30/0956; B60W 2710/202; B60W 30/18163; B60W 30/08; B60W 40/02; B60W 40/105; B60W 2520/10; B60R 11/04; G06V 20/588; H04N 7/181; H04N 23/90
See application file for complete search history.

(56) References Cited

U.S. PATENT DOCUMENTS

| | | | |
|---|---|---|---|
| 8,473,144 B1 * | 6/2013 | Dolgov | G08G 1/167 701/28 |
| 11,697,417 B2 * | 7/2023 | Clarke | B60W 30/143 701/28 |
| 2016/0306357 A1 * | 10/2016 | Wieskamp | B60W 30/12 |
| 2021/0269089 A1 * | 9/2021 | Kuenzner | B62D 6/08 |
| 2022/0324444 A1 * | 10/2022 | Germain | B62D 15/025 |

FOREIGN PATENT DOCUMENTS

KR    10-1354681    2/2014

* cited by examiner

*Primary Examiner* — Isaac G Smith
*Assistant Examiner* — Nikki Marie M Molina
(74) *Attorney, Agent, or Firm* — WOMBLE BOND DICKINSON (US) LLP

(57) ABSTRACT

A driver assistance system include a camera mounted on a host vehicle and having an external field of view of the host vehicle and a controller configured to process image data captured by the camera. The controller may analyze the image data to determine whether a lane splitting vehicle approaching or close to the host vehicle is present and control a steering device of the host vehicle so that the host vehicle laterally moves away from a lane line close to the lane splitting vehicle when the lane splitting vehicle is present.

18 Claims, 9 Drawing Sheets

(a)

(b)

(a)

(b)

DRIVER ASSISTANCE SYSTEM AND DRIVER ASSISTANCE METHOD

CROSS-REFERENCE TO RELATED APPLICATION

This application is based on and claims priority under 35 U.S.C. § 119 to Korean Patent Application No. 10-2022-0009189, filed on Jan. 21, 2022 in the Korean Intellectual Property Office, the disclosure of which is incorporated herein by reference.

BACKGROUND

1. Field

Embodiments of the present disclosure relate to a driver assistance system and a driver assistance method.

2. Description of the Related Art

Recently, as traffic congestion has become severe, lane splitting, which is for traveling between lanes in which motorcycles or bicycles travel in a space between two lanes, tends to be allowed.

Under the road environment in which the lane splitting is applied, an autonomous vehicle needs a function of avoiding motorcycles that travel between lanes for safe operation.

The autonomous vehicle is equipped with a driver assistance system, so-called advanced driver assistance system (ADAS). The ADAS is a technique of assisting a driver by a vehicle recognizing specific situations that occur while driving and controlling mechanical devices.

As ADASs, there are known highway driving assist (HDA) systems for assisting a vehicle to travel along the center of a lane while adjusting a speed of the vehicle by itself according to a vehicle speed set by a driver and a distance from a preceding vehicle, lane following assist (LFA) systems for assisting the vehicle to travel to the center of the lane while finely adjusting a steering wheel, and the like.

Since such an ADAS has only a lane center maintenance function of allowing a vehicle to maintain traveling on the center of a lane and a biased traveling function of allowing the vehicle to modify a traveling route in a lane to an opposite side when there is a risk of collision with a front vehicle or a vehicle on an adjacent side lane and travel on the modified traveling route, it is difficult to detect motorcycles or bicycles that travel between the lanes and intervene to avoid a collision.

SUMMARY

Therefore, it is an aspect of the present disclosure to provide a driver assistance system and a driver assistance method capable of more effectively avoiding a collision by detecting a lane splitting vehicle that conducts lane splitting.

Additional aspects of the disclosure will be set forth in part in the description which follows and, in part, will be obvious from the description, or may be learned by practice of the disclosure.

In accordance with one aspect of the present disclosure, a driver assistance system includes a camera mounted on a host vehicle and having an external field of view of the host vehicle and a controller configured to process image data captured by the camera. The controller may analyze the image data to determine whether a lane splitting vehicle approaching or close to the host vehicle is present and control a steering device of the host vehicle so that the host vehicle laterally moves away from a lane line close to the lane splitting vehicle when the lane splitting vehicle is present.

When the host vehicle is under steering control of following a lane line of the host vehicle to maintain traveling on the center of a traveling lane or under steering control of following a lateral position of a preceding vehicle, the controller may control the steering device of the host vehicle so that the host vehicle laterally moves away from the lane line close to the lane splitting vehicle.

The camera may have a front field of view and a rear field of view of the vehicle.

The controller may analyze rear image data captured by the camera to determine whether a lane splitting vehicle approaching behind the host vehicle is present and control the steering device so that the host vehicle laterally moves away from a traveling route of the lane splitting vehicle when the lane splitting vehicle is present.

The controller may control the steering device based on a lateral position of a following vehicle positioned behind the host vehicle to move the host vehicle in a direction of moving away from the lane splitting vehicle.

The controller may control the steering device based on a position of the lane splitting vehicle to move the host vehicle in a direction of moving away from the lane splitting vehicle.

The lane splitting vehicle may include a motorcycle, an electric scooter, a bicycle, or another small vehicle.

When a traveling lane of the host vehicle is a first lane or a last lane, a speed of the host vehicle is lower than a preset speed, and a lane width of the traveling lane is greater than a preset width, the controller may determine whether a lane splitting vehicle approaching or close to the host vehicle is present.

When a traveling lane of the host vehicle is a first lane or a last lane, a speed of the host vehicle is lower than a preset speed, and a lane width of the traveling lane is greater than a preset width, the controller may control the steering device to move the host vehicle in a direction of moving away from the lane splitting vehicle.

In accordance with another aspect of the present disclosure, a driver assistance method includes receiving image data captured by a camera having an external field of view of a host vehicle, analyzing the received image data and determining whether a lane splitting vehicle approaching or close to the host vehicle is present, and controlling a steering device of the host vehicle so that the host vehicle laterally moves away from a lane line close to the lane splitting vehicle when the lane splitting vehicle is present.

The controlling of the steering device of the host vehicle may include controlling the steering device of the host vehicle so that the host vehicle laterally moves away from the lane line close to the lane splitting vehicle when the host vehicle is under steering control of following a lane line of the host vehicle to maintain traveling on the center of a traveling lane or under steering control of following a lateral position of a preceding vehicle.

The determining of whether the lane splitting vehicle is present may include analyzing rear image data captured by the camera and determining whether a lane splitting vehicle approaching behind the host vehicle is present, and the controlling of the steering device of the host vehicle may include controlling the steering device so that the host vehicle laterally moves away from a traveling route of the lane splitting vehicle when the lane splitting vehicle is present.

The controlling of the steering device of the host vehicle may include controlling the steering device based on a lateral position of a following vehicle positioned behind the host vehicle to move the host vehicle in a direction of moving away from the lane splitting vehicle.

The controlling of the steering device of the host vehicle may include controlling the steering device based on a position of the lane splitting vehicle to move the host vehicle in a direction of moving away from the lane splitting vehicle.

The lane splitting vehicle may include a motorcycle, an electric scooter, a bicycle, or another small vehicle or small mobility including an electric kickboard, an electric wheel, or the like.

The determining of whether the lane splitting vehicle is present may include determining whether a lane splitting vehicle approaching or close to the host vehicle is present when a traveling lane of the host vehicle is a first lane or a last lane, a speed of the host vehicle is lower than a preset speed, and a lane width of the traveling lane is greater than a preset width.

The controlling of the steering device of the host vehicle may include controlling the steering device to move the host vehicle in a direction of moving away from the lane splitting vehicle when a traveling lane of the host vehicle is a first lane or a last lane, a speed of the host vehicle is lower than a preset speed, and a lane width of the traveling lane is greater than a preset width.

The controlling of the steering device of the host vehicle may include controlling a steering control torque of the host vehicle according to a first steering control torque curve for maintaining the host vehicle to travel on a center of a lane before finding the lane splitting vehicle and controlling the steering control torque of the host vehicle according to a second steering control torque curve based on collision avoidance control for the lane splitting vehicle after finding the lane splitting vehicle.

The second steering control torque curve may be a curve in which the first steering control torque curve is adjusted to follow a lateral position of a following vehicle positioned behind the host vehicle.

The second steering control torque curve may be a curve in which the first steering control torque curve is adjusted to follow a lateral position determined from a found position of the lane splitting vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The same reference numbers indicate the same components throughout the specification. The specification does not describe all elements of embodiments, and general contents or overlapping contents between the embodiments in the technical field to which the disclosure pertains will be omitted. Terms "unit, module, member, and block" used in the specification may be implemented as software or hardware, and according to the embodiments, a plurality of "units, modules, members, and blocks" may be implemented as one component or one "unit, module, member, and block" may also include a plurality of components.

Throughout the specification, when a certain portion is described as being "connected" to another, this includes not only a case of being directly connected but also a case of being indirectly connected, and the indirect connection includes the connection through a wireless communication network.

In addition, when a certain portion is described as "including," a certain component, this means further including other components rather than precluding other components unless especially stated otherwise.

Throughout the specification, when a certain member is described as being positioned "on" another, this includes not only a case where the certain member is in contact with another but also a case where other members are present between the two members.

Terms such as first and second are used to distinguish one component from another, and the components are not limited by the above-described terms. A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Figure 1:
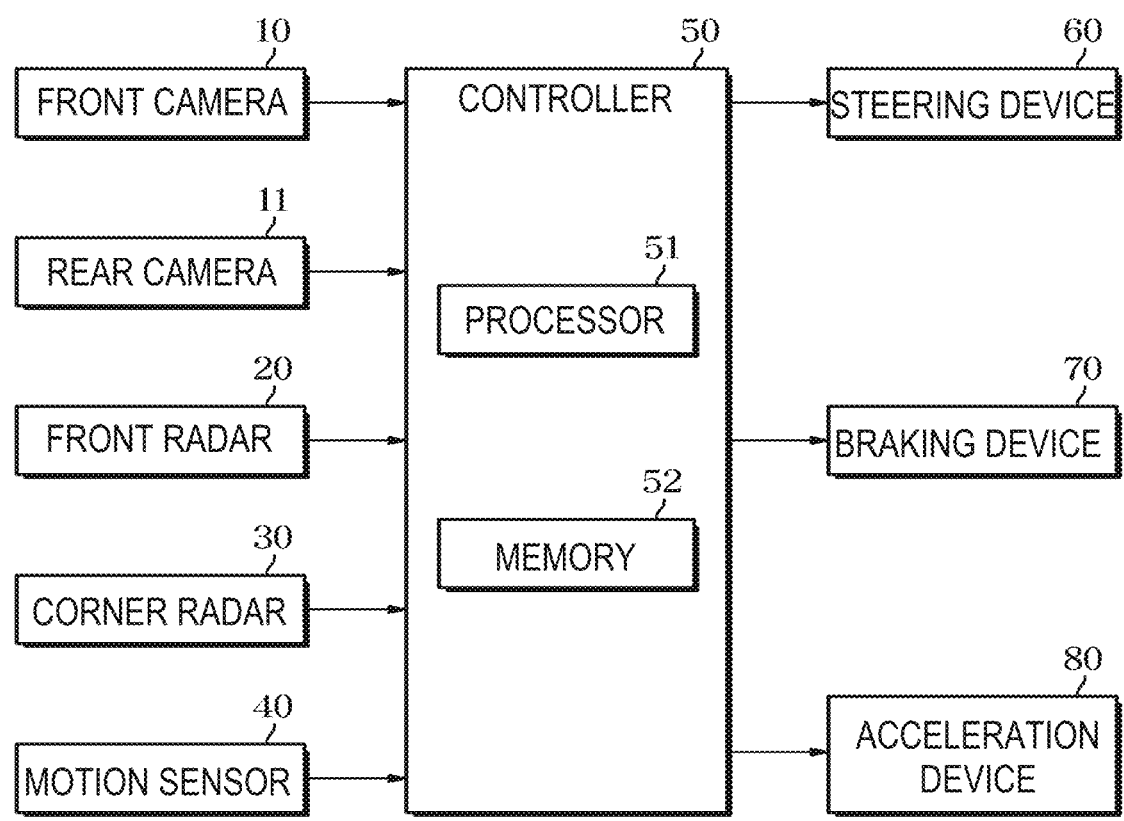
FIG. 1 is a control block diagram of a driver assistance system according to an embodiment.

FIG. 1 is a control block diagram of a driver assistance system according to an embodiment.

Referring to FIG. 1, the driver assistance system may include a front camera 10, a rear camera 11, a front radar 20, a corner radar 30, a motion sensor 40, and a controller 50.

The controller 50 may perform overall control of the driver assistance system.

The front camera 10, the rear camera 11, the front radar 20, the corner radar 30, and the motion sensor 40 may be electrically connected to the controller 50.

The controller 50 may control a steering device 60, a braking device 70, and an acceleration device 80. In addition, other electronic devices of the vehicle may also be electrically connected to the controller 50.

Each of the front camera 10, the rear camera 11, the front radar 20, the corner radar 30, and the motion sensor 40 may include a controller (electronic control unit (ECU)). The controller 50 may also be implemented as an integrated controller including a controller of the front camera 10, a controller of the rear camera 11, a controller of the front radar 20, a controller of the corner radar 30, and a controller of the motion sensor 40.

The front camera 10 may capture an image in front of the vehicle and identify another vehicle, a pedestrian, a cyclist, a motorcyclist, a lane, a road sign, and the like. In addition, the front camera 10 may identify road structures such as a median strip and a guard rail.

The front camera 10 may include a plurality of lenses and an image sensor. The image sensor may include a plurality of photodiodes for converting light into electrical signals, and the plurality of photodiodes may be disposed in the form of a two-dimensional matrix.

The front camera 10 may be electrically connected to the controller 50. For example, the front camera 10 may be connected to the controller 50 via a vehicle communication network, connected to the controller 50 via a hard wire, or connected to the controller 50 via a printed circuit board (PCB).

The front camera 10 may transmit data on the image in front of the vehicle to the controller 50.

The rear camera 11 may capture an image behind the vehicle and identify another vehicle, a pedestrian, a cyclist, a motorcyclist, a lane, a road sign, and the like. In addition, the rear camera 11 may identify road structures such as a median strip and a guard rail.

The rear camera 11 may have the same configuration as the front camera 10.

The rear camera 11 may be electrically connected to the controller 50.

The rear camera 11 may transfer data on the image behind the vehicle to the controller 50.

The front radar 20 and the corner radar 30 may acquire relative positions, relative speeds, and the like of objects (e.g., another vehicle, a pedestrian, and a cyclist) around the vehicle.

The front radar 20 and the corner radar 30 may be connected to the controller 50 via an NT, a hard wire, or a PCB.

The front radar 20 and the corner radar 30 may transmit radar data to the controller 50. These radars may also be implemented as a light detection and ranging (LiDAR) device.

The motion sensor 40 may acquire motion data of the vehicle. For example, the motion sensor 40 may include a speed sensor for detecting a wheel speed, an acceleration sensor for detecting lateral acceleration and longitudinal acceleration of the vehicle, a yaw rate sensor for detecting a change in angular speed of the vehicle, a gyro sensor for detecting an inclination of the vehicle, a steering angle sensor for detecting a rotation and steering angle of the steering wheel, and/or a torque sensor for detecting a steering torque of the steering wheel. The motion data may include a speed, longitudinal acceleration, lateral acceleration, a steering angle, a steering torque, a traveling direction, a yaw rate, and/or an inclination of the vehicle.

The steering device 60 may change the traveling direction of the vehicle under the control of the controller 50.

The braking device 70 may decelerate the vehicle by braking wheels of the vehicle under the control of the controller 50.

The acceleration device 80 may decelerate the vehicle by driving an engine and/or a driving motor for providing a driving force to the vehicle under the control of the controller 50.

The controller 50 may include a processor 51 and a memory 52.

The controller 50 may include one or more processors 51. The one or more processors 51 included in the controller 50 may also be integrated into one chip or may also be physically separate. In addition, the processor 51 and the memory 52 may also be implemented as a single chip.

The processor 51 may process front image data of the front camera 10, rear image data of the rear camera 11, front radar data of the front radar 20, and corner radar data of the corner radar 30. In addition, the processor 51 may generate a steering signal for controlling the steering device 60, a braking signal for controlling the braking device 70, and an acceleration signal for controlling the acceleration device 80.

For example, the processor 51 may include an image signal processor for processing the front image data of the front camera 10 and the rear image data of the rear camera 11, a digital signal processor for processing the radar data of the radars 20 and 30, and a micro control unit (MCU) for generating a steering signal, a braking signal, and an acceleration signal.

The memory 52 may store programs and/or data for the processor 51 to process the image data. The memory 52 may store programs and/or data for the processor 51 to process the radar data. In addition, the memory 52 may store programs and/or data for the processor 51 to generate control signals related to the configuration of the vehicle.

The memory 52 may temporarily store the image data received from the front camera 10 and/or rear camera 11 and/or the radar data received from the radars 20 and 30. In addition, the memory 52 may temporarily store a result of processing the image data and/or the radar data by the processor 51. The memory 52 may include a non-volatile memory such as a flash memory, a read only memory (ROM), or an erasable programmable ROM (EPROM) as well as a volatile memory such as a static random access memory (SRAM) or a dynamic random access memory (DRAM).

Figure 2:
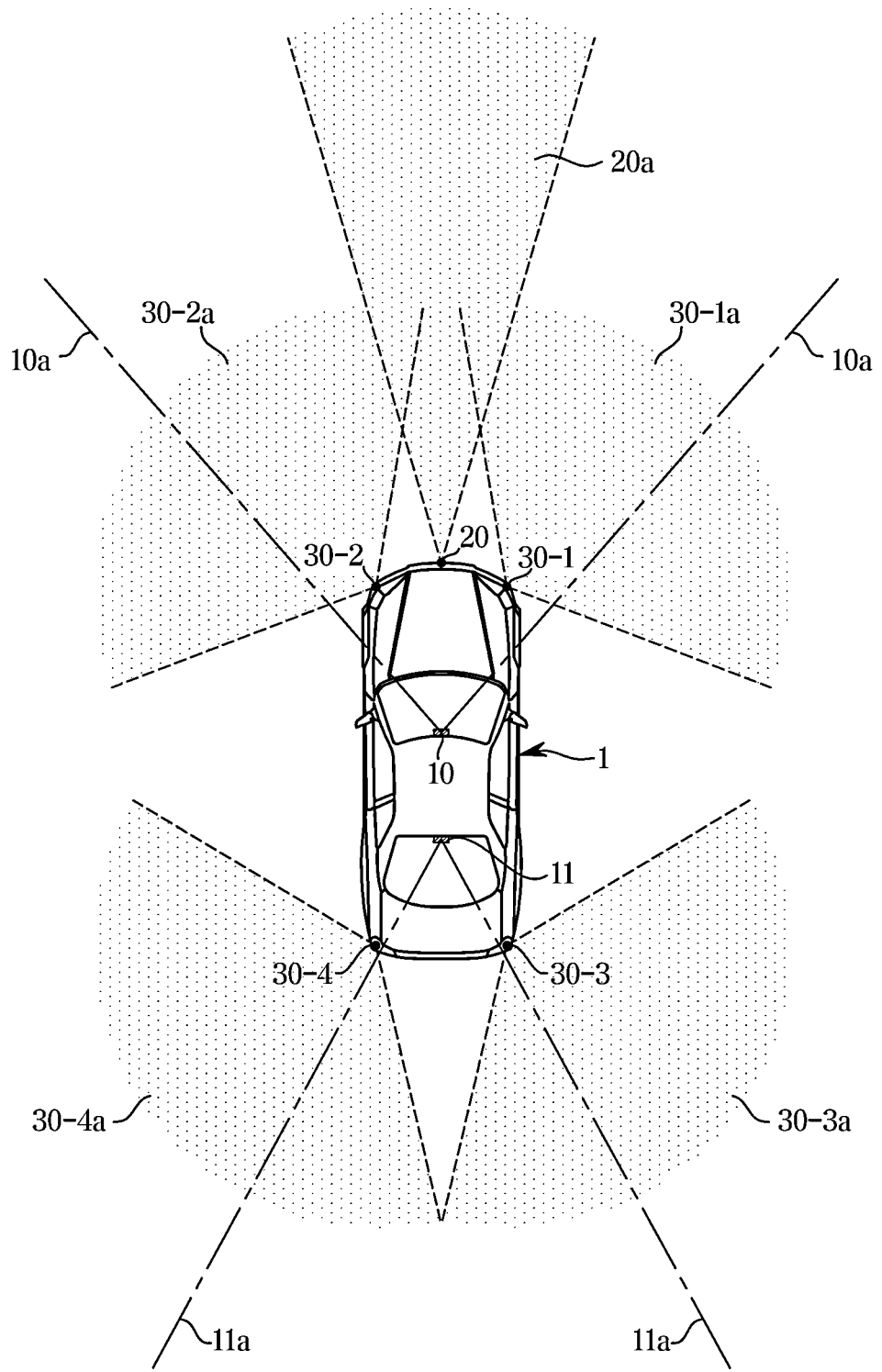
FIG. 2 illustrates a camera and a radar of the driver assistance system according to the embodiment.

FIG. 2 illustrates a front camera and a radar of the driver assistance system according to the embodiment.

Referring to FIG. 2, the front camera 10 may have a front field of view 10a of the vehicle 1. For example, the front camera 10 may be installed on a front windshield of the vehicle 1. The front camera 10 may capture an image in front of the vehicle 1 and acquire data on the image in front of the vehicle 1. The data on the image in front of the vehicle 1 may include position information on another vehicle, a pedestrian, a cyclist, a motorcyclist, a lane, and intersection structures (a median strip, a guard rail, and the like) positioned in front of the vehicle 1.

The rear camera 11 may have a rear field of view 11a of the vehicle 1. For example, the rear camera 11 may be installed on a rear windshield of the vehicle 1. The rear camera 11 may capture an image behind the vehicle 1 and acquire data on the image behind the vehicle 1. The data on the image behind the vehicle 1 may include position information on another vehicle, a pedestrian, a cyclist, a motorcyclist, a lane, and intersection structures (a median strip, a guard rail, and the like) positioned behind the vehicle 1.

The front radar 20 may have a front sensing field of view 20a of the vehicle 1. The front radar 20 may be, for example, installed on a grille or a bumper of the vehicle 1.

The front radar 20 may include a transmission antenna (or a transmission antenna array) for radiating a transmission radio wave forward from the vehicle 1 and a reception antenna (or a reception antenna array) for receiving a reflected radio wave reflected on an object. The front radar 20 may acquire front radar data from the transmission radio wave transmitted by the transmission antenna and the reflected radio wave received by the reception antenna.

The front radar data may include distance information and speed information on another vehicle, a pedestrian, and a cyclist positioned in front of the vehicle 1. In addition, the front radar data may include distance information on intersection structures, such as a median strip and a guard rail, positioned in front of the vehicle 1.

The front radar 20 may calculate a relative distance to the object based on a phase difference (or a time difference) between the transmission radio wave and the reflected radio wave and calculate a relative speed of the object based on a frequency difference between the transmission radio wave and the reflected radio wave.

The corner radar 30 may include a first corner radar 30-1 installed on a front right of the vehicle 1, a second corner radar 30-2 installed on a front left of the vehicle 1, a third corner radar 30-3 installed on a rear right of the vehicle 1, and a fourth corner radar 30-4 installed on a rear left of the vehicle 1.

The first corner radar 30-1 may have a front right sensing field of view 30-1a of the vehicle 1. The second corner radar 30-2 may have a front left sensing field of view 30-2a of the vehicle 1, the third corner radar 30-3 may have a rear right sensing field of view 30-3a of the vehicle 1, and the fourth corner radar 30-4 may have a rear left sensing field of view 30-4a of the vehicle 1.

Each of the corner radars 30 may include the transmission antenna and the reception antenna. The first, second, third, and fourth corner radars 30-1, 30-2, 30-3, and 30-4 can acquire first corner radar data, second corner radar data, third corner radar data, and fourth corner radar data, respectively. The first corner radar data may include distance information and speed information on an object positioned at the front right of the vehicle 1. The second corner radar data may include distance information and speed information on an object positioned at the front left of the vehicle 1. The third and fourth corner radar data may include distance information and speed information on objects positioned at the rear right of the vehicle 1 and the rear left of the vehicle 1.

Referring back to FIG. 2, the controller 50 may detect and/or identify objects in front of the vehicle 1 based on the front image data of the front camera 10 and the front radar data of the front radar 20 and acquire position information (distances and directions) and speed information (relative speeds) of the objects in front of the vehicle 1. In addition, the processor 51 may acquire position information (distances and directions) and speed information (relative speeds) of objects at the sides (front right, front left, rear right, and rear left) of the vehicle 1 based on the corner radar data of the plurality of corner radars 30. In addition, the processor 51 may detect and/or identify objects behind the vehicle 1 based on the rear image data of the rear camera 11 and/or the corner radar data of the plurality of corner radars 30 and acquire position information (distances and directions) and speed information (relative speeds) of the objects behind the vehicle 1.

Figure 3:
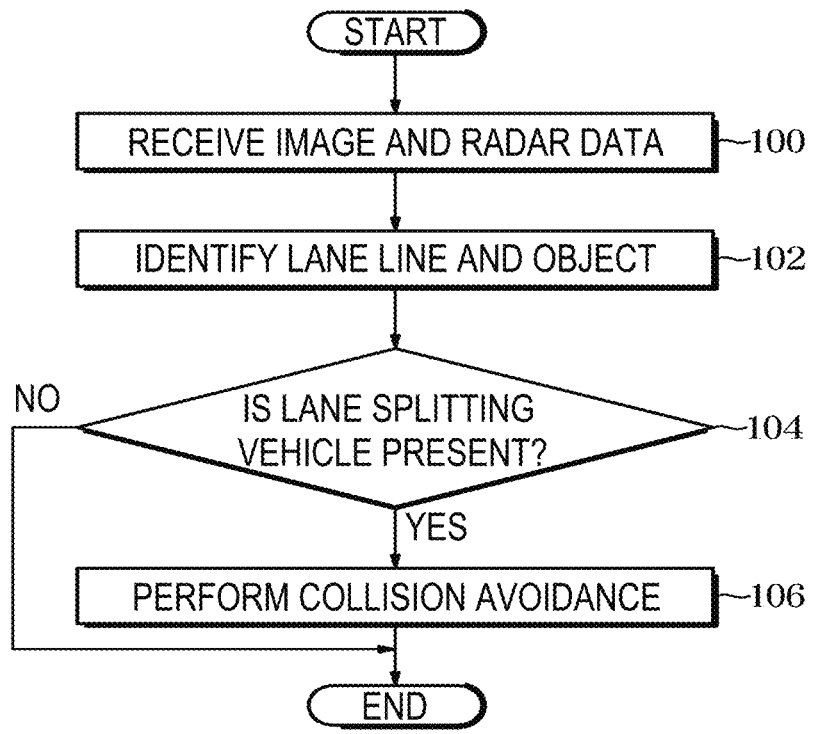
FIG. 3 is a control flowchart of a driver assistance method according to an embodiment.

FIG. 3 is a control flowchart of a driver assistance method according to an embodiment.

Referring to FIG. 3, the controller 50 receives the front and/or rear image data acquired by the cameras 10 and 11 and receives the front radar data and/or corner radar data acquired by the radars 20 and 30 (100). The controller 50 may receive the front image data from the front camera 10 and receive the rear image data from the rear camera 11. The controller 50 may receive the front radar data from the front radar 20. The controller 50 may receive the corner radar data from the corner radar 30.

The controller 50 analyzes the image data and the radar data and identifies lane lines and objects in front of and/or behind the vehicle (102).

The controller 50 determines whether there is a lane splitting vehicle close to or approaching the front and/or rear of the vehicle based on the identified lanes and objects (104). The lane splitting vehicle may include a motorcycle, a motor scooter, a bicycle, or another small vehicle. In addition, the lane splitting vehicle may include a small mobility including electric kickboards, electric wheels, and the like. For example, it may be determined that the motorcycle conducts lane splitting when the motorcycle travels along the lane or within a preset distance laterally with respect to the lane.

When a lane splitting vehicle is present (Yes in 104), the controller 50 controls the steering device 60 and/or the braking device 70 to move laterally away from a traveling route of the lane splitting vehicle and perform collision avoidance control for avoiding a collision with the lane splitting vehicle (106).

Hereinafter, determining the presence of a lane splitting vehicle will be described in detail.

Figure 4:
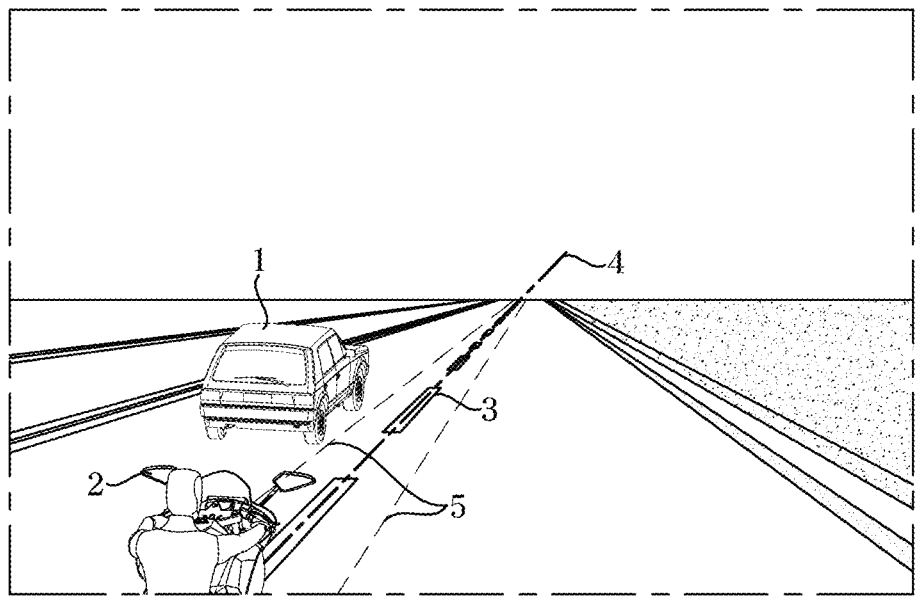
FIG. 4 illustrates an operation of detecting a lane splitting motorcycle in the driver assistance system according to the embodiment.

FIG. 4 illustrates an operation of detecting a lane splitting motorcycle in the driver assistance system according to the embodiment.

FIG. 4 illustrates a situation in which a motorcycle 2 conducts lane splitting on a rear right side of a host vehicle 1.

The host vehicle 1 may be under steering control of following a lane ahead and maintaining the center of the lane or under steering control of following a lateral position of a preceding vehicle.

The motorcycle 2 may be approaching the host vehicle 1 while conducting the lane splitting between lanes at a rear right side of the host vehicle 1.

The host vehicle 1 acquires rear image data through the rear camera 11 and analyzes the rear image data to identify a lane 3 and the motorcycle 2.

The host vehicle 1 may compare a center axis 4 of the motorcycle 2 and the boundary of the lane 3 of the motorcycle 2 and determine that the motorcycle 2 conducts the lane splitting between the lanes at the rear right of the host vehicle 1 when the boundary of the lane 3 is aligned with the center axis 4 of the motorcycle 2 or within a preset distance 5 from the center axis 4. The motorcycle 2 may not travel to be exactly parallel to the lane. The motorcycle 2 may also travel while crossing the center axis 4 and the lane boundary. In preparation for this case, it may be determined that the motorcycle 2 conducts the lane splitting even when the motorcycle 2 crosses the center axis 4 and the lane boundary for a preset time. The center axis 4 of the motorcycle 2 is a virtual line extending through the center of the motorcycle 2. The preset distance 5 may be determined based on a width of the motorcycle 2.

FIG. 4 illustrates a situation in which the motorcycle 2 conducts the lane splitting between the lanes at the rear right of the host vehicle 1, but the present disclosure is not limited thereto, and the above description may also be applied to a situation in which the motorcycle 2 conducts lane splitting near the end of a first lane or the end of a last lane in the same manner.

Hereinafter, collision avoidance control will be described in detail.

Figure 5:
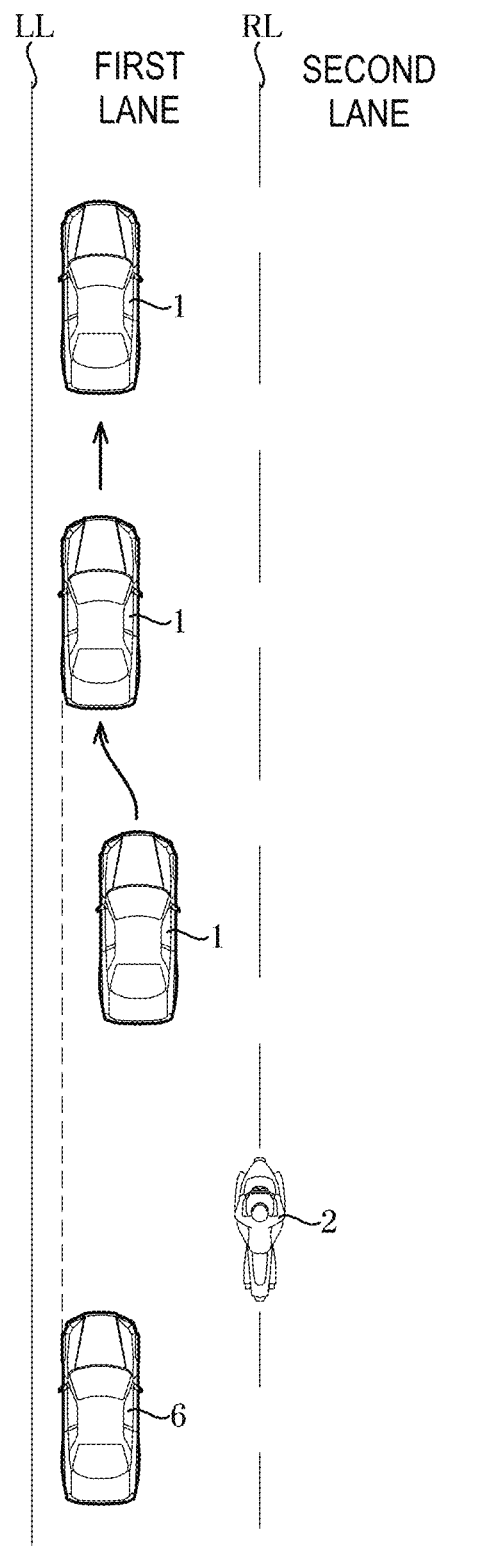
FIG. 5 illustrates collision avoidance control for a rear lane splitting motorcycle in the driver assistance system according to the embodiment.

FIG. 5 illustrates collision avoidance control for a rear lane splitting motorcycle in the driver assistance system according to the embodiment.

Referring to FIG. 5, when a lane splitting motorcycle 2 is present between a first lane and a second lane at the rear right side of the host vehicle 1 that travels on the first lane, an auxiliary steering torque is generated through the steering device 60 of the host vehicle 1 so that a safety separation distance between the host vehicle 1 and the lane splitting motorcycle 2 increases, and thus the host vehicle 1 moves closer to a left lane line LL of the first lane.

As described above, the steering control torque of the host vehicle 1 may be controlled so that the host vehicle 1 moves slightly closer to the left lane line LL of the first lane, thereby increasing the safety separation distance between the host vehicle 1 and the lane splitting motorcycle 2.

The host vehicle 1 may be under steering control of recognizing lane lines LL and RL of the first lane and following the recognized lane lines LL and RL to travel the center of the lane or under steering control of following the lateral position of the preceding vehicle.

When the host vehicle 1 is under steering control of recognizing lane lines LL and RL of the first lane and following the recognized lane lines LL and RL to travel the center of the lane or under steering control of following the lateral position of the preceding vehicle on the first lane, the host vehicle 1 may change a following target to a lateral position of a following vehicle 6 of the first lane instead of the lateral position of the preceding vehicle on the first lane when finding the lane splitting motorcycle 2 and perform the steering control of the host vehicle 1 to follow the lateral position of the following vehicle 6 of the first lane. In addition, it is possible to perform the steering control of the host vehicle 1 to be close to an opposite direction according to a found position of the lane splitting motorcycle 2.

Figure 6:
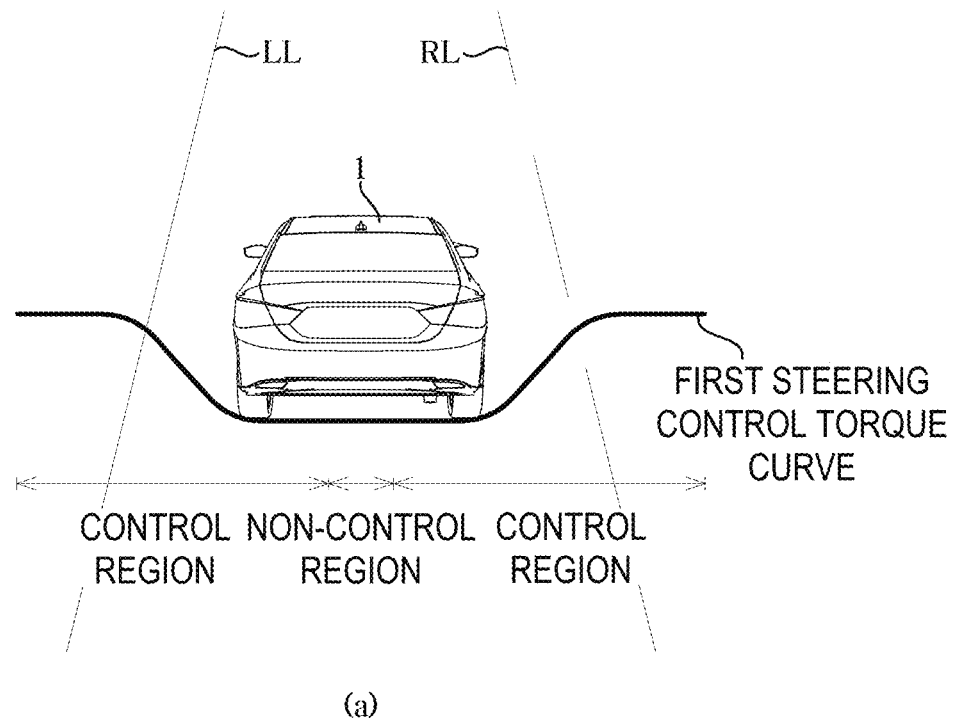
FIG. 6 illustrates a steering control torque and a control region upon performing collision avoidance control of FIG. 5.
Figure 6:
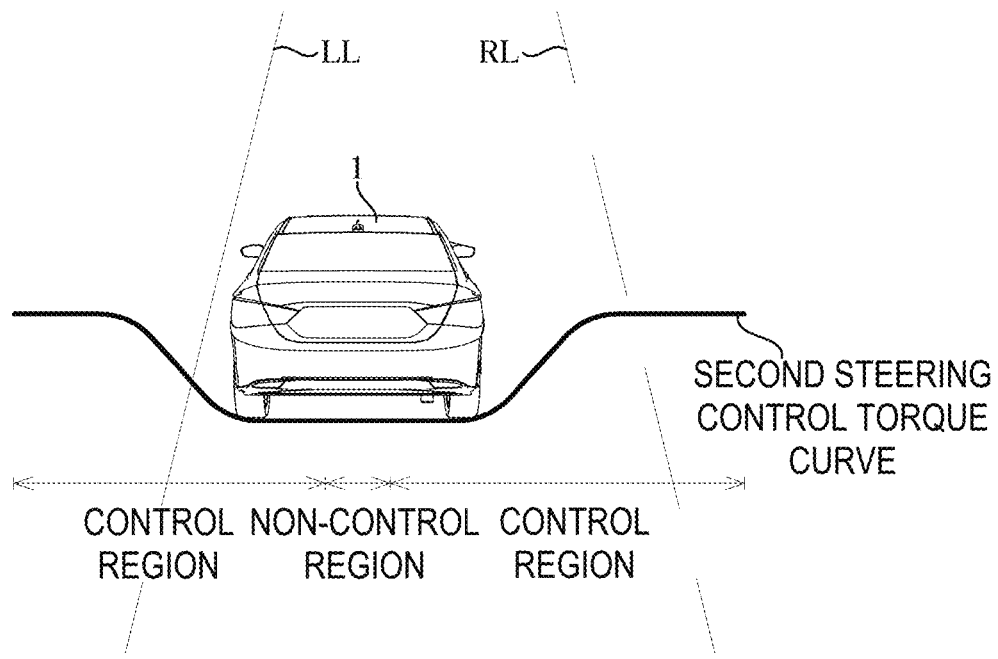

FIG. 6 illustrates a steering control torque and a control region upon performing collision avoidance control of FIG. 5.

Referring to FIG. 6, before the host vehicle 1 finds the lane splitting motorcycle 2, the host vehicle 1 may control the steering control torque according to a first steering control torque curve so that the host vehicle 1 maintains the center of the second lane.

The first steering control torque curve is the same as, for example, the steering control torque curve used in the existing lane following assist (LFA), and reflects a change in steering control torque value according to a change in position of the host vehicle 1 by setting a predetermined position of a control region at a certain interval from an edge of a non-control region inside left and right lanes to a start point.

The first steering control torque curve is preset by setting a predetermined position at a certain interval from an initial position of the host vehicle 1 positioned in the non-control region inside the left and right lane lines to a reference point, and the steering control torque value increases as the vehicle wheel of the host vehicle 1 leaving the non-control region moves away from the non-control region and is limited to a maximum torque value from a certain position. At this time, the non-control region and the control region for the first steering control torque curve are based on a position for allowing the host vehicle 1 to maintain traveling on the center of the lane.

Meanwhile, after the host vehicle 1 finds the lane splitting motorcycle 2, the host vehicle 1 may control the steering control torque according to a second steering control torque curve based on the collision avoidance control for the lane splitting motorcycle so that the host vehicle 1 may move slightly closer to the left lane line LL of the first lane and follow the lateral position of the following vehicle 6 of the first lane.

The second steering control torque curve is a curve in which the first steering control torque curve is adjusted so that the host vehicle 1, which maintains the center of the lane due to the lane splitting motorcycle 2, follows the lateral position of the following vehicle 6 instead of the center of the lane. In addition, the second steering control torque curve is a curve in which the first steering control torque curve is adjusted so that the host vehicle 1, which maintains the center of the lane due to the lane splitting motorcycle 2, follows the lateral position determined from the found position of the lane splitting motorcycle 2 instead of the center of the lane.

Figure 7:
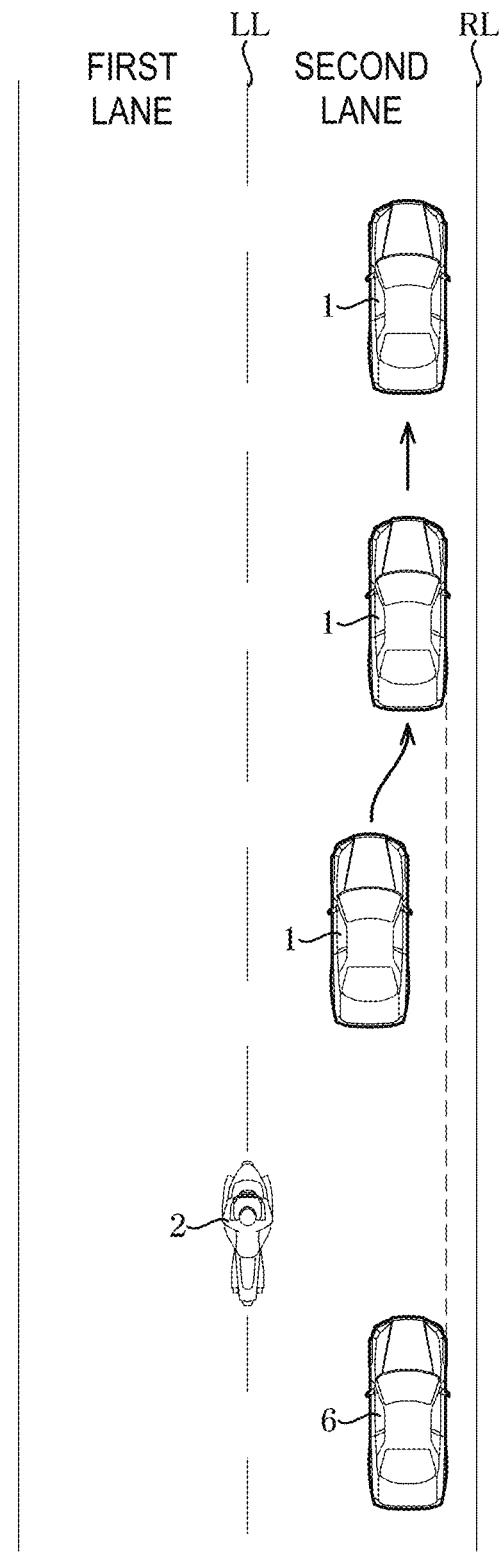
FIG. 7 illustrates collision avoidance control for a rear lane splitting motorcycle in a driver assistance system according to another embodiment.

FIG. 7 illustrates collision avoidance control for a rear lane splitting motorcycle in a driver assistance system according to another embodiment.

Referring to FIG. 7, when a lane splitting motorcycle 2 is present between a first lane and a second lane at a rear left side of a host vehicle 1 that travels on the second lane, which is the last lane, an auxiliary steering torque is generated through a steering device 60 of the host vehicle 1 so that a safety separation distance between the host vehicle 1 and a lane splitting motorcycle 2 increases, and thus the host vehicle 1 moves slightly closer to a right lane line RL of the second lane.

As described above, a steering control torque of the host vehicle 1 may be controlled so that the host vehicle 1 moves slightly closer to the right lane line RL of the second lane, thereby increasing the safety separation distance between the host vehicle 1 and the lane splitting motorcycle 2.

The host vehicle 1 may be under steering control of recognizing lane lines LL and RL of the second lane and following the recognized lane lines LL and RL to travel on the center of the second lane or under steering control of following a lateral position of a preceding vehicle on the second lane.

When the host vehicle 1 is under steering control of recognizing lane lines LL and RL of the second lane and following the recognized lane lines LL and RL to travel on the center of the second lane or under steering control of following the lateral position of the preceding vehicle on the second lane, the host vehicle 1 may change a following target to a lateral position of a following vehicle 6 instead of the lateral position of the preceding vehicle on the second lane when finding the lane splitting motorcycle 2 and perform the steering control of the host vehicle 1 to follow the lateral position of the following vehicle 6 of the second lane. In addition, it is possible to perform the steering control of the host vehicle 1 to be close to an opposite direction according to a found position of the lane splitting motorcycle 2.

Figure 8:
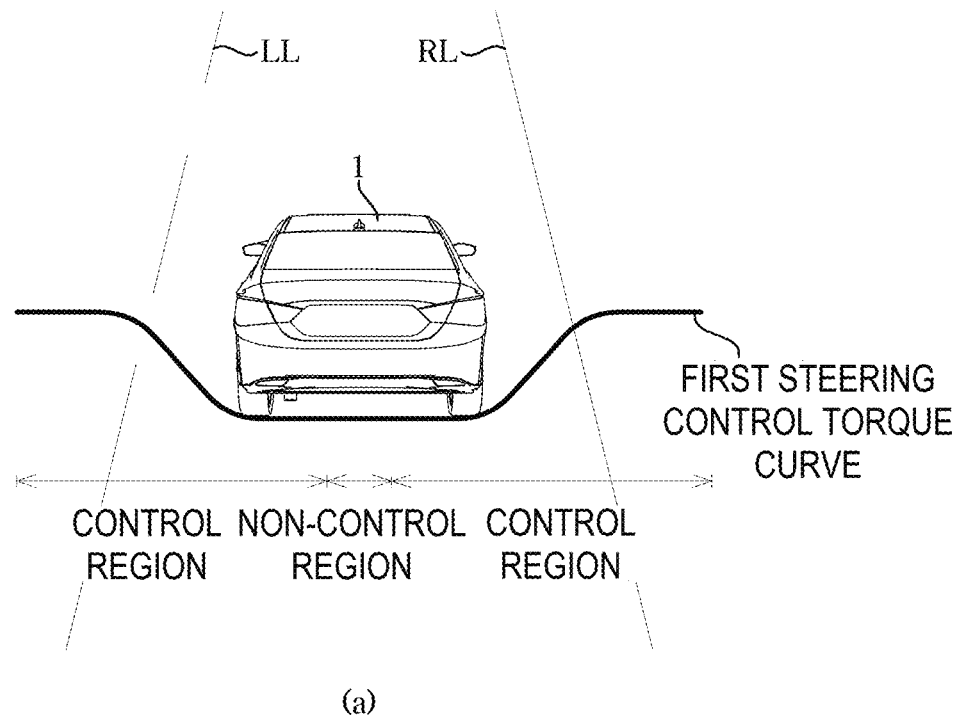
FIG. 8 illustrates a steering control torque and a control region upon performing collision avoidance control of FIG. 7.
Figure 8:
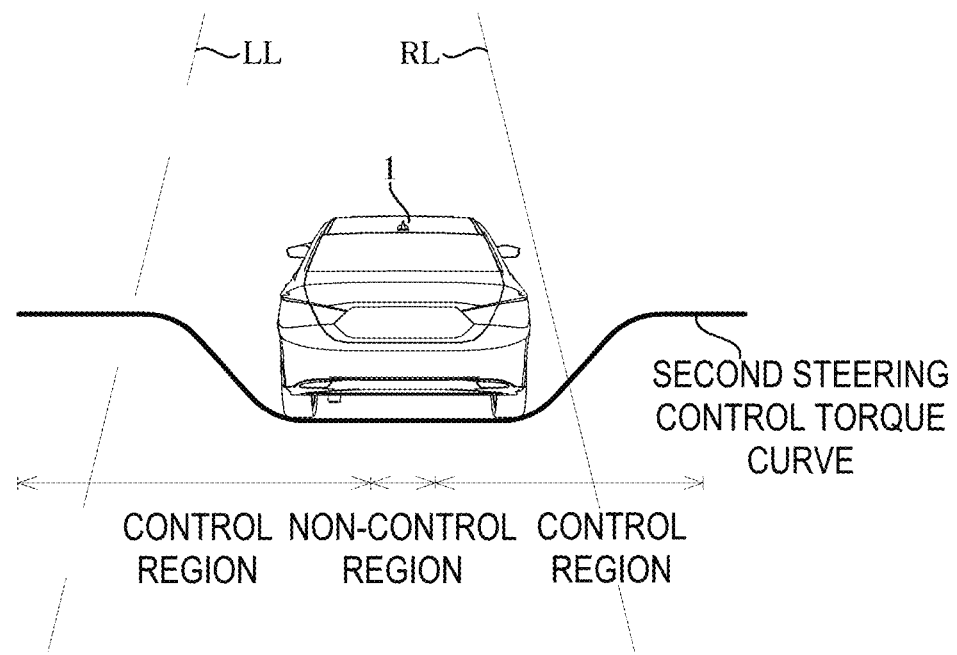

FIG. 8 illustrates a steering control torque and a control region upon performing collision avoidance control of FIG. 7.

Referring to FIG. 8, before the host vehicle 1 finds the lane splitting motorcycle 2, the host vehicle 1 may control the steering control torque according to a first steering control torque curve so that the host vehicle 1 maintains traveling on the center of the second lane.

Meanwhile, after the host vehicle 1 finds the lane splitting motorcycle 2, the host vehicle 1 may control the steering control torque according to the second steering control torque curve based on the collision avoidance control for the lane splitting motorcycle so that the host vehicle 1 may move slightly closer to the right lane line RL of the second lane and follow the lateral position of the following vehicle 6 of the second lane.

Figure 9:
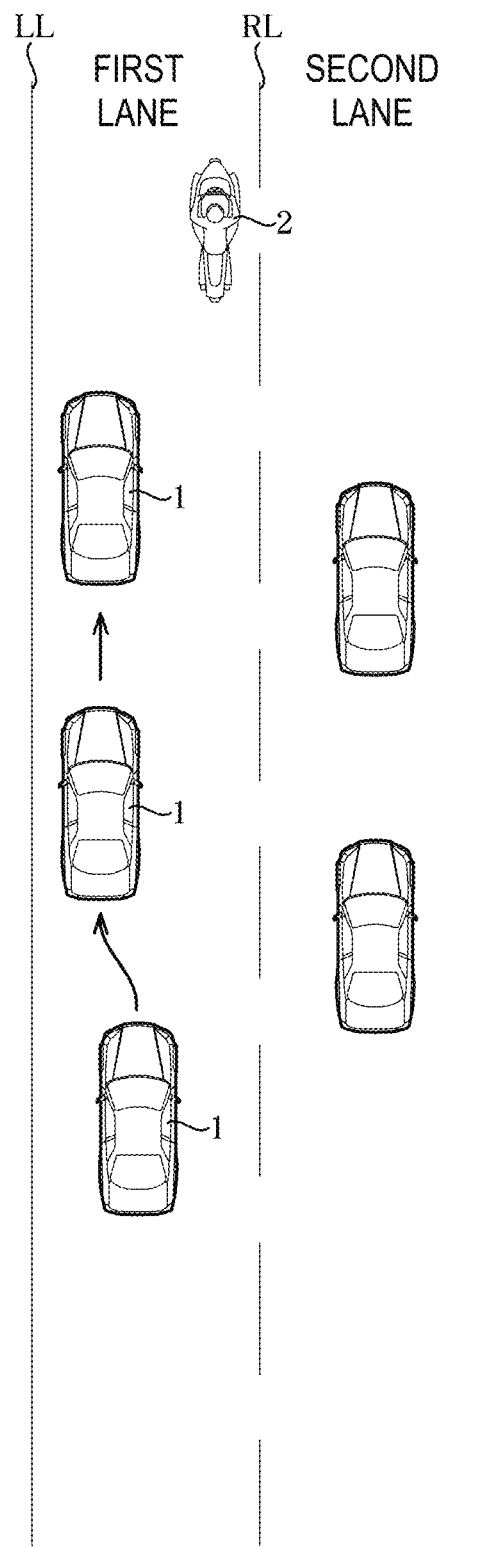
FIGS. 9 and 10 illustrate collision avoidance control for a front lane splitting motorcycle in a driver assistance system according to still another embodiment.
Figure 10:
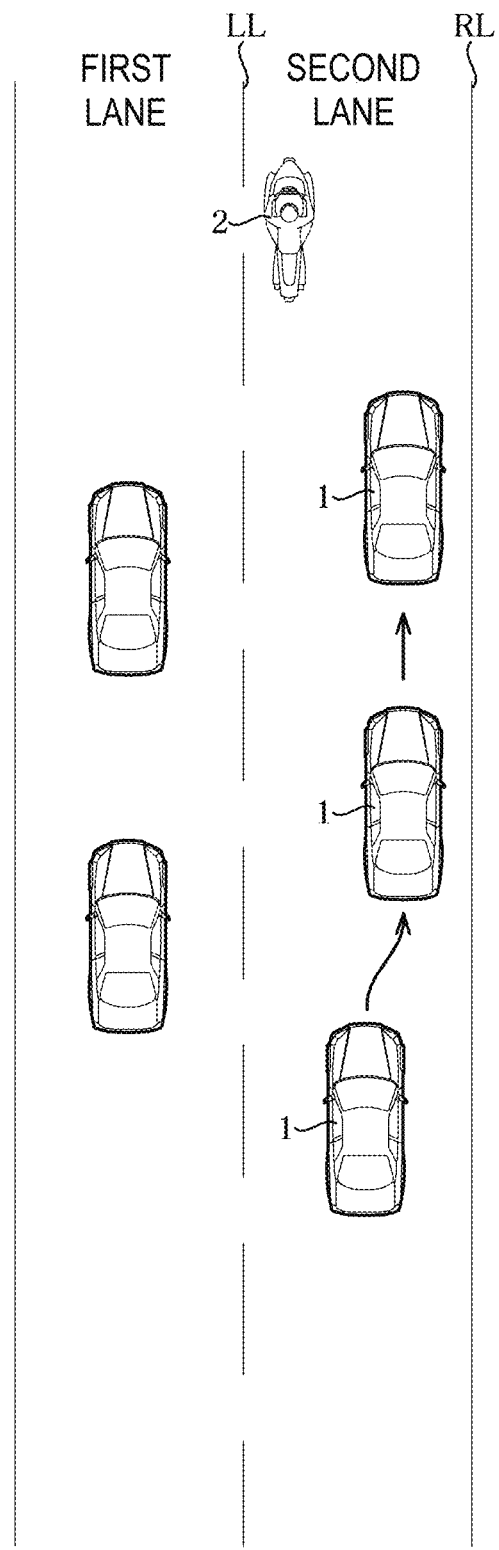

FIGS. 9 and 10 illustrate collision avoidance control for a front lane splitting motorcycle in a driver assistance system according to still another embodiment.

Referring to FIG. 9, when a lane splitting motorcycle 2 is present between a first lane and a second lane in front of a host vehicle 1 that travels on the first lane, an auxiliary steering torque is generated through a steering device 60 of the host vehicle 1 so that a safety separation distance between the host vehicle 1 and the lane splitting motorcycle 2 increases, and thus the host vehicle 1 moves slightly closer to a left lane line LL of the first lane. For example, a distance between a left wheel of the host vehicle 1 and the left lane line LL may be 30 cm.

As described above, a steering control torque of the host vehicle 1 may be controlled so that the host vehicle 1 moves slightly closer to the left lane line LL of the first lane, thereby increasing the lateral safety separation distance between the host vehicle 1 and the lane splitting motorcycle 2.

Referring to FIG. 10, when the lane splitting motorcycle 2 is present between the first lane and the second lane in front of the host vehicle 1 that travels on the second lane, an auxiliary steering torque is generated through the steering device 60 of the host vehicle 1 so that a safety separation distance between the host vehicle 1 and the lane splitting motorcycle 2 increases, and thus the host vehicle 1 moves slightly closer to a right lane line RL of the second lane. For example, a distance between a right wheel of the host vehicle 1 and the right lane line RL may be 30 cm.

As described above, a steering control torque of the host vehicle 1 may be controlled so that the host vehicle 1 moves slightly closer to the right lane line RL of the second lane, thereby increasing the lateral safety separation distance between the host vehicle 1 and the lane splitting motorcycle 2.

Meanwhile, according to the present disclosure, it is possible to perform the steering control for avoiding the collision with the lane splitting vehicle by determining whether a traveling lane of the host vehicle 1 is the first lane or the last lane, a speed of the host vehicle 1 is lower than a preset speed (e.g., 30 kph), a lane width of the traveling lane is greater than or equal to a preset width (e.g., 3.4 m), and a difference in relative speeds is smaller than or equal to a preset relative speed (e.g., 10 kph) while a preceding vehicle, a following vehicle, and a vehicle on an adjacent lane are present, determining whether a lane splitting vehicle is present at a rear right side of the host vehicle 1 when at least two among the four conditions are satisfied, and changing and maintaining a traveling route according to a lateral position of the following vehicle 6 or a found position of the lane splitting vehicle so that a safety separation distance between the host vehicle 1 and the lane splitting vehicle increases when the lane splitting vehicle is present.

In addition, according to the present disclosure, it is possible to perform the steering control for avoiding the collision with the lane splitting vehicle by determining whether the traveling lane of the host vehicle 1 is the first lane or the last lane, the speed of the host vehicle 1 is lower than the preset speed (e.g., 30 kph), the difference in relative speeds is smaller than or equal to the preset relative speed (e.g., 10 kph) while the preceding vehicle, the following vehicle, and the vehicle on the adjacent lane are present, determining whether a lane splitting vehicle is present in front of the host vehicle 1 when at least two among the four conditions are satisfied, and changing and maintaining a traveling route according to a found position of the lane splitting vehicle so that a safety separation distance between the host vehicle 1 and the lane splitting vehicle increases when the lane splitting vehicle is present.

As described above, according to the present disclosure, it is possible to detect a lane splitting vehicle such as a motorcycle or bicycle, thereby more effectively avoiding a collision with the lane splitting vehicle.

Meanwhile, the above-described controller and/or components thereof may include one or more processors/microprocessors coupled to a computer-readable recording medium for storing computer-readable code/algorithm/software. The processor/microprocessor(s) may execute the computer-readable code/algorithm/software stored in the computer-readable recording medium to perform the above-described functions, operations, steps, and the like.

The above-described controller and/or components thereof may further include a memory implemented as a computer-readable non-temporary recording medium or a computer-readable temporary recording medium. The memory may be controlled by the above-described controller and/or components thereof, configured to store data transmitted to or received from the above-described controller and/or components thereof, or configured to store data processed or to be processed by the above-described controller and/or components thereof.

The disclosed embodiments may also be implemented as the computer-readable code/algorithm/software on the computer-readable recording medium. The computer-readable recording medium may be the computer-readable non-temporary recording medium such as a data storage device capable of storing data that may be read by the processor/microprocessor. Examples of the computer-readable recording medium include a hard disk drive (HDD), a solid-state drive (SSD), a silicon disk drive (SDD), a ROM, a CD-ROM, a magnetic tape, a floppy disk, an optical data storage device, and the like.

As is apparent from the above description, it is possible to more effectively avoid a collision with the lane splitting vehicle by detecting a lane splitting vehicle such as a motorcycle or bicycle that conducts lane splitting.

What is claimed is:

1. A driver assistance system comprising:
    a camera mounted on a host vehicle and having an external field of view of the host vehicle; and a controller configured to process image data captured by the camera,
    wherein the controller is configured to:
    analyze the image data to determine whether a lane splitting vehicle approaching or close to the host vehicle is present,
    control a steering device of the host vehicle so that the host vehicle laterally moves away from a lane line close to the lane splitting vehicle when the lane splitting vehicle is present,
    control the steering device based on a lateral position of a following vehicle positioned behind the host vehicle to move the host vehicle in a direction of moving away from the lane splitting vehicle, and control a steering control torque of the host vehicle according to a second steering control torque curve which is a curve in which a first steering control curve is adjusted to follow a lateral position of a following vehicle positioned behind the host vehicle.

2. The driver assistance system of claim 1, wherein, when the host vehicle is under steering control of following a lane line of the host vehicle to maintain traveling on a center of a traveling lane or under steering control of following a lateral position of a preceding vehicle, the controller is configured to control the steering device of the host vehicle so that the host vehicle laterally moves away from the lane line close to the lane splitting vehicle.

3. The driver assistance system of claim 1, wherein the camera has have a front field of view and a rear field of view of the vehicle.

4. The driver assistance system of claim 3, wherein the controller is configured to analyze rear image data captured by the camera to determine whether a lane splitting vehicle approaching behind the host vehicle is present, and control the steering device so that the host vehicle laterally moves away from a traveling route of the lane splitting vehicle when the lane splitting vehicle is present.

5. The driver assistance system of claim 1, wherein the controller is configured to control the steering device based on a position of the lane splitting vehicle to move the host vehicle in a direction of moving away from the lane splitting vehicle.

6. The driver assistance system of claim 1, wherein the lane splitting vehicle comprises a motorcycle, an electric scooter, a bicycle, or another small vehicle.

7. The driver assistance system of claim 1, wherein, when a traveling lane of the host vehicle acquired from a camera is a first lane or a last lane, a speed of the host vehicle acquired from a speed sensor is lower than a preset speed, and a lane width of the traveling lane determined based on recognized lanes is greater than a preset width, the controller is configured to determine whether a lane splitting vehicle approaching or close to the host vehicle is present.

8. The driver assistance system of claim 1, wherein, when a traveling lane of the host vehicle acquired from a camera is a first lane or a last lane, a speed of the host vehicle acquired from a speed sensor is lower than a preset speed, and a lane width of the traveling lane determined based on recognized lanes is greater than a preset width, the controller is configured to control the steering device to move the host vehicle in a direction of moving away from the lane splitting vehicle.

9. A driver assistance method comprising:
receiving image data captured by a camera having an external field of view of a host vehicle;
analyzing the received image data and determining whether a lane splitting vehicle approaching or close to the host vehicle is present; and
controlling a steering device of the host vehicle so that the host vehicle laterally moves away from a lane line close to the lane splitting vehicle when the lane splitting vehicle is present,
wherein the controlling of the steering device of the host vehicle includes:
controlling the steering device based on a lateral position of a following vehicle positioned behind the host vehicle to move the host vehicle in a direction of moving away from the lane splitting vehicle; and
controlling a steering control torque of the host vehicle according to a second steering control torque curve which is a curve in which a first steering control curve is adjusted to follow a lateral position of a following vehicle positioned behind the host vehicle.

10. The method of claim 9, wherein the controlling of the steering device of the host vehicle includes controlling the steering device of the host vehicle so that the host vehicle laterally moves away from the lane line close to the lane splitting vehicle when the host vehicle is under steering control of following a lane line of the host vehicle to maintain traveling on a center of a traveling lane or under steering control of following a lateral position of a preceding vehicle.

11. The method of claim 9, wherein the determining of whether the lane splitting vehicle is present includes analyzing rear image data captured by the camera, and determining whether a lane splitting vehicle approaching behind the host vehicle is present, and
the controlling of the steering device of the host vehicle includes controlling the steering device so that the host vehicle laterally moves away from a traveling route of the lane splitting vehicle when the lane splitting vehicle is present.

12. The method of claim 9, wherein the controlling of the steering device of the host vehicle includes controlling the steering device based on a position of the lane splitting vehicle to move the host vehicle in a direction of moving away from the lane splitting vehicle.

13. The method of claim 9, wherein the lane splitting vehicle comprises a motorcycle, an electric scooter, a bicycle, or another small vehicle or small mobility including an electric kickboard, an electric wheel, or the like.

14. The method of claim 9, wherein the determining of whether the lane splitting vehicle is present includes determining whether a lane splitting vehicle approaching or close to the host vehicle is present when a traveling lane of the host vehicle acquired from a camera is a first lane or a last lane, a speed of the host vehicle acquired from a speed sensor is lower than a preset speed, and a lane width of the traveling lane determined based on recognized lanes is greater than a preset width.

15. The method of claim 9, wherein the controlling of the steering device of the host vehicle includes controlling the steering device to move the host vehicle in a direction of moving away from the lane splitting vehicle when a traveling lane of the host vehicle acquired from a camera is a first lane or a last lane, a speed of the host vehicle acquired from a speed sensor is lower than a preset speed, and a lane width of the traveling lane determined based on recognized lanes is greater than a preset width.

16. The method of claim 9, wherein the controlling of the steering device of the host vehicle includes:
controlling a steering control torque of the host vehicle according to a first steering control torque curve for maintaining the host vehicle to travel on a center of a lane before finding the lane splitting vehicle; and
controlling the steering control torque of the host vehicle according to a second steering control torque curve based on collision avoidance control for the lane splitting vehicle after finding the lane splitting vehicle.

17. The method of claim 16, wherein the second steering control torque curve is a curve in which the first steering control torque curve is adjusted to follow a lateral position of a following vehicle positioned behind the host vehicle, adjusted in a direction adjacent to the opposite side of the lateral position of the following vehicle.

18. The method of claim 16, wherein the second steering control torque curve is a curve in which the first steering control torque curve is adjusted to follow a lateral position determined from a found position of the lane splitting vehicle, adjusted in a direction adjacent to the opposite side of the lateral position of the lane splitting vehicle.

\* \* \* \* \*